United States Patent [19]

Kitterman

[11] 4,014,170
[45] Mar. 29, 1977

[54] THERMAL ENGINE

[76] Inventor: Roger L. Kitterman, Star Rte. Box 644, Tonopah, Ariz. 85354

[22] Filed: Jan. 8, 1976

[21] Appl. No.: 647,621

[52] U.S. Cl. .................................. 60/529; 60/325
[51] Int. Cl.² .......................................... F03G 7/06
[58] Field of Search ............ 60/325, 527, 528, 529; 417/379

[56] References Cited

UNITED STATES PATENTS

| | | | |
|---|---|---|---|
| 3,430,441 | 3/1969 | Adams | 60/529 |
| 3,678,685 | 7/1972 | Low et al. | 60/529 |
| 3,913,326 | 10/1975 | Banks | 60/527 |

*Primary Examiner*—Allen M. Ostrager
*Attorney, Agent, or Firm*—Drummond, Nelson & Ptak

[57] ABSTRACT

A thermal motor is disclosed for converting heat energy to hydramechanical energy. A plurality of heat-responsive elements are mounted on a rotor to periodically expose the elements to heating and cooling. Thermally responsive elements generate a mechanical movement in response to the heating and cooling. The mechanical movement actuates a hydraulic cylinder which, in turn, operates a hydraulic motor. The output of the hydraulic motor is used to perform useful work and also to rotate the rotor. In one preferred form, the heat-responsive elements are in the form of bimetallic strips which mechanically deflect.

8 Claims, 11 Drawing Figures

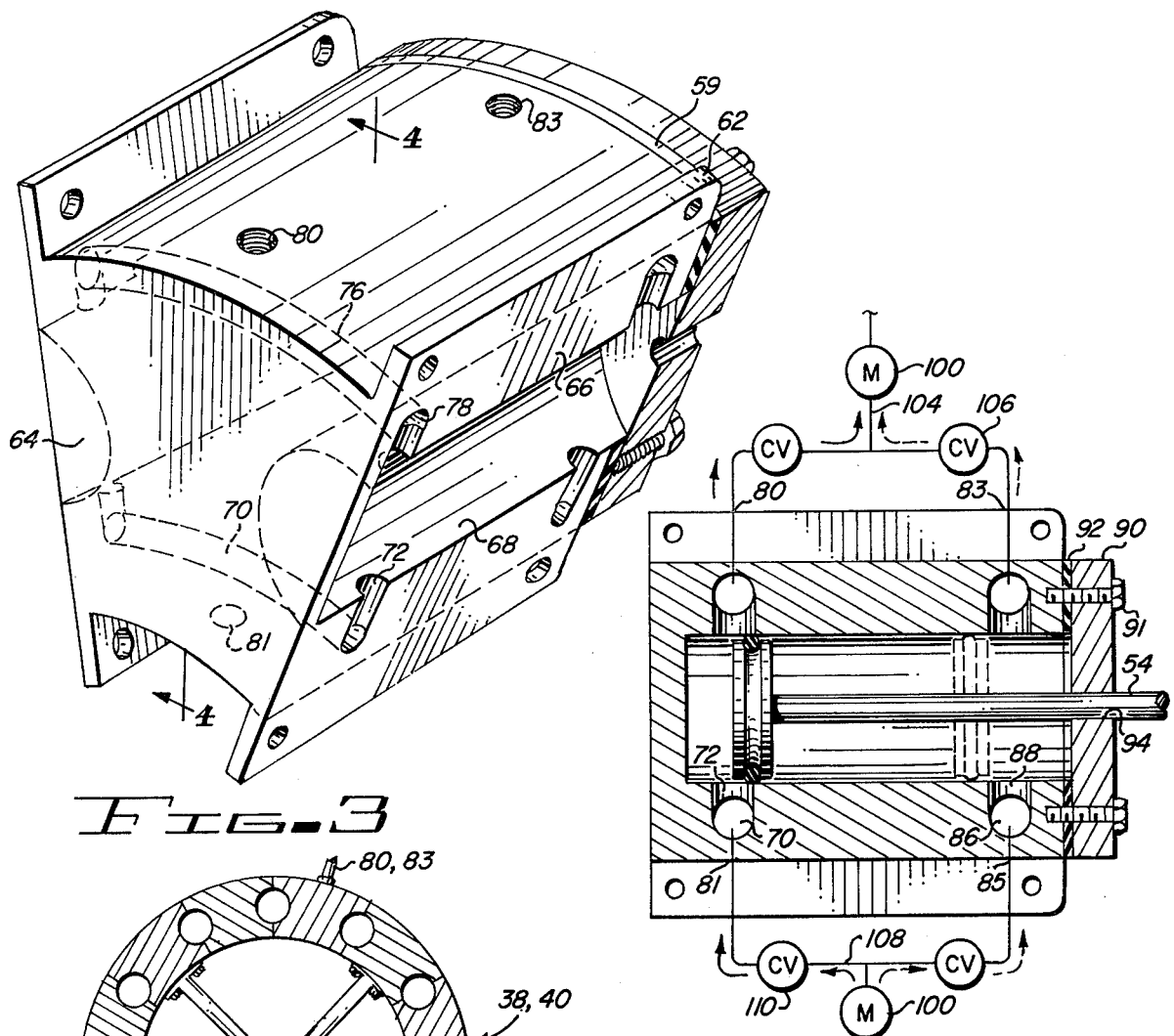
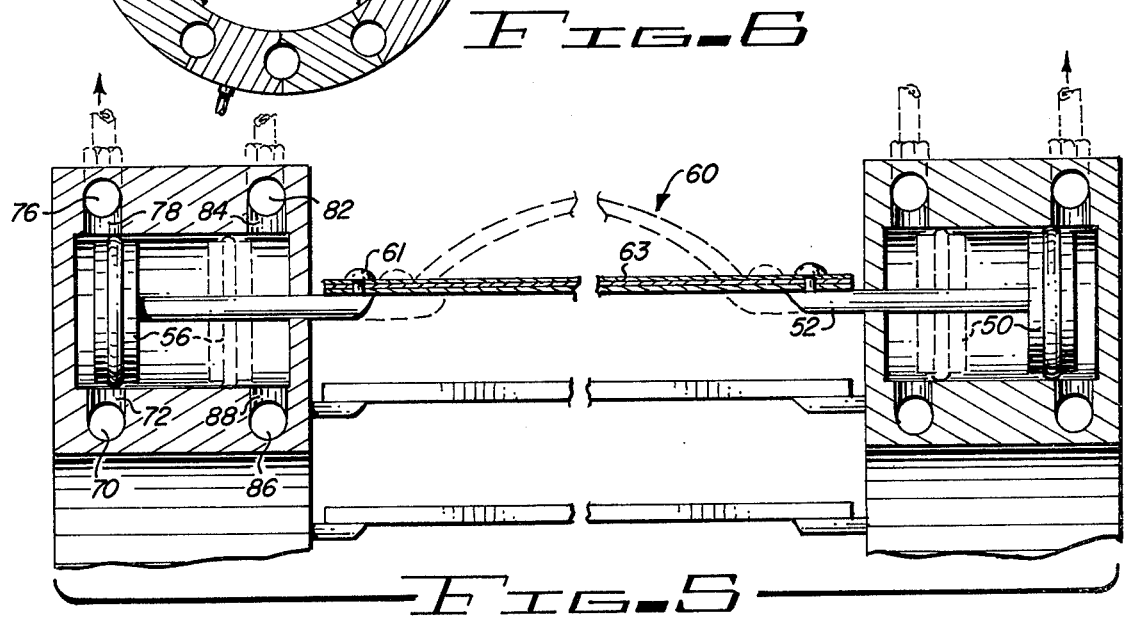

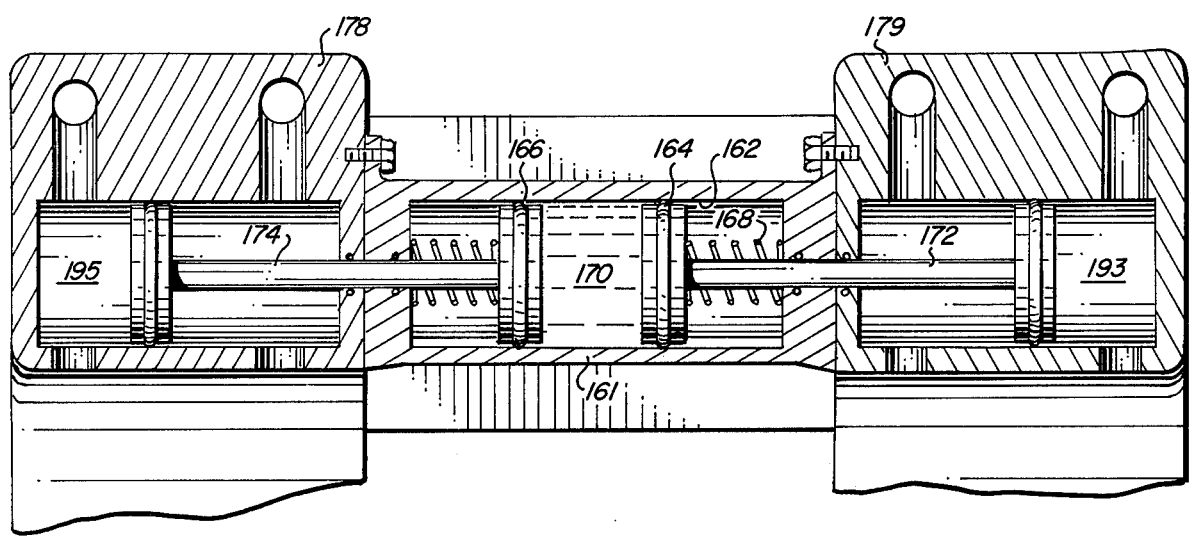
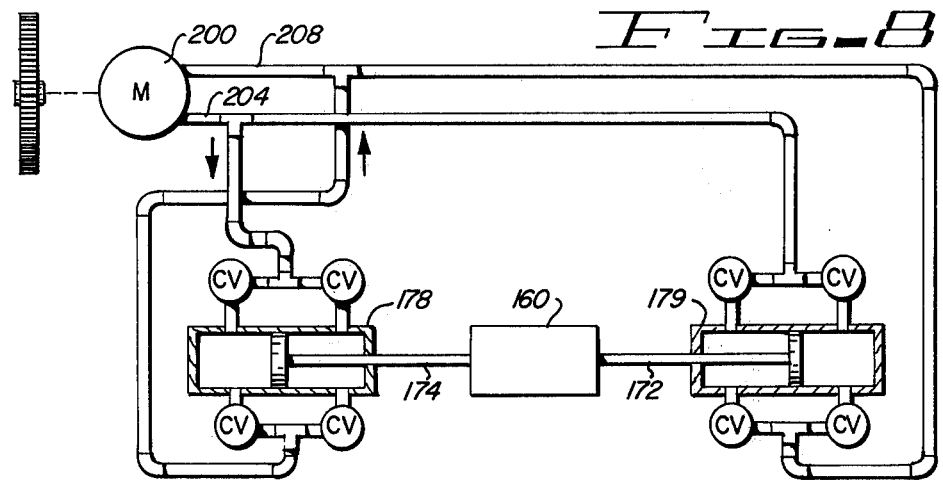
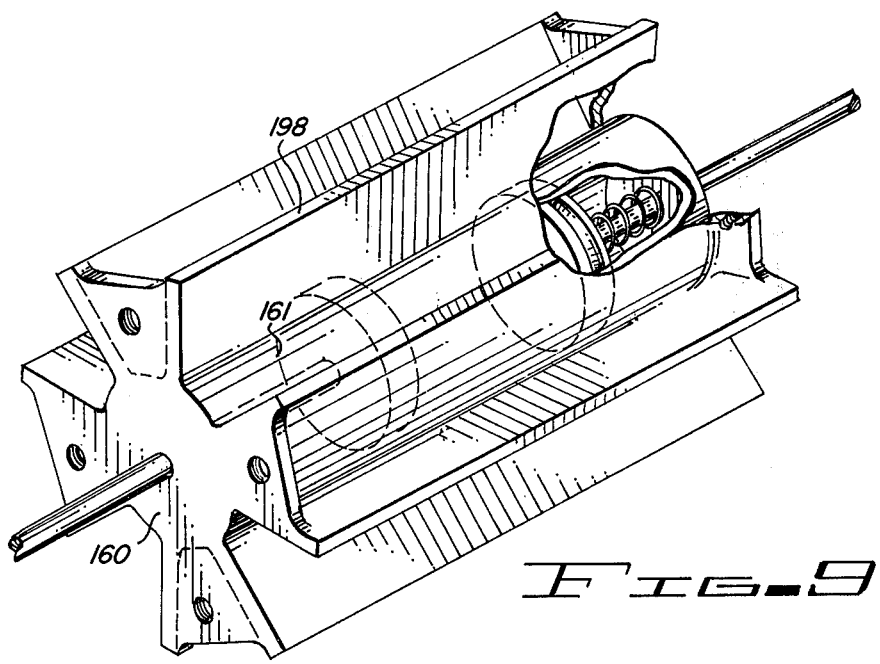

THERMAL ENGINE

The present invention relates to a thermal engine. More particularly, the present invention relates to an engine for the conversion of heat energy into hydra-mechanical energy by thermal expansion and contraction of an appropriate element.

It is estimated that the amount of solar energy directed by the sun on the earth in just 3 days is equivalent of the earth's total supply of all fossil fuels. The energy of the sun should continue to be available for another 5 billion years. Accordingly, considerable research has been done and is presently being done to explore every means of employing the almost infinite energy available from the sun.

The principal thrust of solar research has been in several areas. One area of development has been in the field of solar collectors which are devices designed to absorb radiant solar energy. The collectors may be of various designs, and may be simply a flat plate device for absorbing heat energy, or may be more elaborate, including concentrating or focusing devices. Concentrators are used in connection with various systems, as for example heating systems, where an appropriate medium or fluid is heated in the collector and used for residential or commercial heating and cooling.

Some research has also been done in the power generating field. Solar Rankine cycle systems using turbo-electric machinery are known which include a solar power plant using a collector, boiler and turbine alternator and condenser. A working fluid is heated to a vapor form in the boiler and conducted or pumped to a turbine, where the thermal energy is converted into rotary mechanical energy to drive an alternator generating electrical power.

The present invention is a departure from the more or less conventional thermal and/or solar systems described above. The present invention relates to a thermal engine capable of converting heat energy to hydraulic energy and then to mechanical energy. The mechanical energy can be used for any appropriate use, including driving an electrical generator so that an electrical output can be obtained. In the thermal engine of the present invention, a heat-responsive element, such as a bi-metallic strip or fluid in an expansion chamber causes mechanical movement or deflection in response to a heat source. The mechanical movement, in turn, is used to generate hydraulic fluid pressure.

Briefly, the present invention comprehends a thermal engine having a heat-responsive element which distorts or which mechanically deflects in response to an applied temperature differential. This element may be in the form of a bi-metallic strip which is mechanically coupled to the rod of a hydraulic cylinder. The distortion or mechanical movement of the bi-metallic strip causes the piston to reciprocate within the cylinder generating flow of hydraulic fluid. Preferably the heat deflectable element and the hydraulic cylinder are commonly mounted on a rotating frame so that the element is continuously heated and cooled through the rotative cycle. The output from the hydraulic motor is connected through suitable gearing to drive an output shaft and may be also utilized to rotate the frame which carries the hydraulic cylinder and heat-responsive element.

Preferably, heating is accomplished from solar energy and the entire unit is mounted on a diurnal tracking mechanism which continually positions the heat-responsive elements so that at least during one portion of the rotation of the frame the elements are optimumly exposed so that the sun's rays fall perpendicular to the surface of the elements. In another embodiment of the present invention, the heat-responsive elements are in the form of chambers containing a fluid having a suitably low boiling point so that a vapor pressure is generated when the element is heated. The vapor pressure, in turn, drives a piston rod which is connected to the hydraulic cylinders for generating fluid flow and pressure.

The above and other objects and advantages of the present invention will become more apparent from the following specification, appended claims and drawings in which:

FIG. 3 is a perspective view illustrating the construction of one of the segments making up the hydraulic cylinders;

FIG. 4 is a sectional view taken along line 4—4 of FIG. 3, also showing the hydraulic circuitry in schematic;

FIG. 5 is a sectional view illustrating the construction of the bi-metallic strip and attached cylinders which form the heat-responsive element utilized in one embodiment of FIG. 1;

FIG. 6 is a sectional view taken along line 6—6 of FIG. 1;

FIG. 7 is a sectional view illustrating another form of the heat-responsive element;

FIG. 8 is a schematic diagram of another form of hydraulic circuit which can be used in connection with the present invention;

FIG. 9 is a perspective view further showing the alternate form of the heat-responsive element of FIG. 7;

Figure 1:
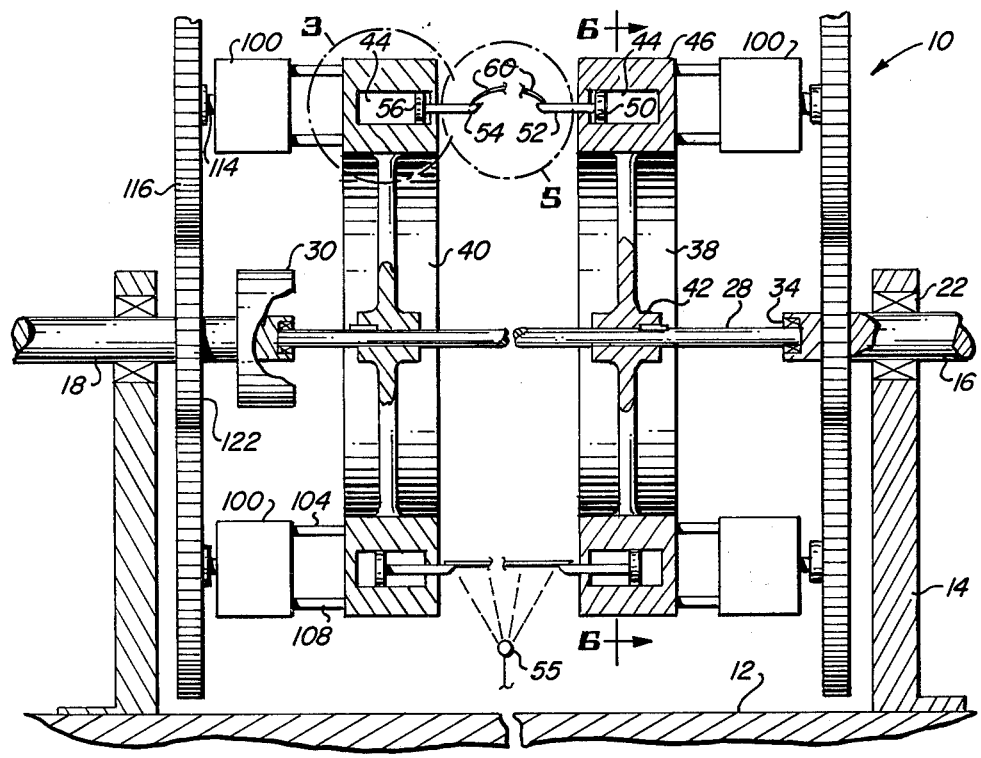
FIG. 1 is a front elevational view, partly in section, of the thermal engine of the present invention.
Figure 2:
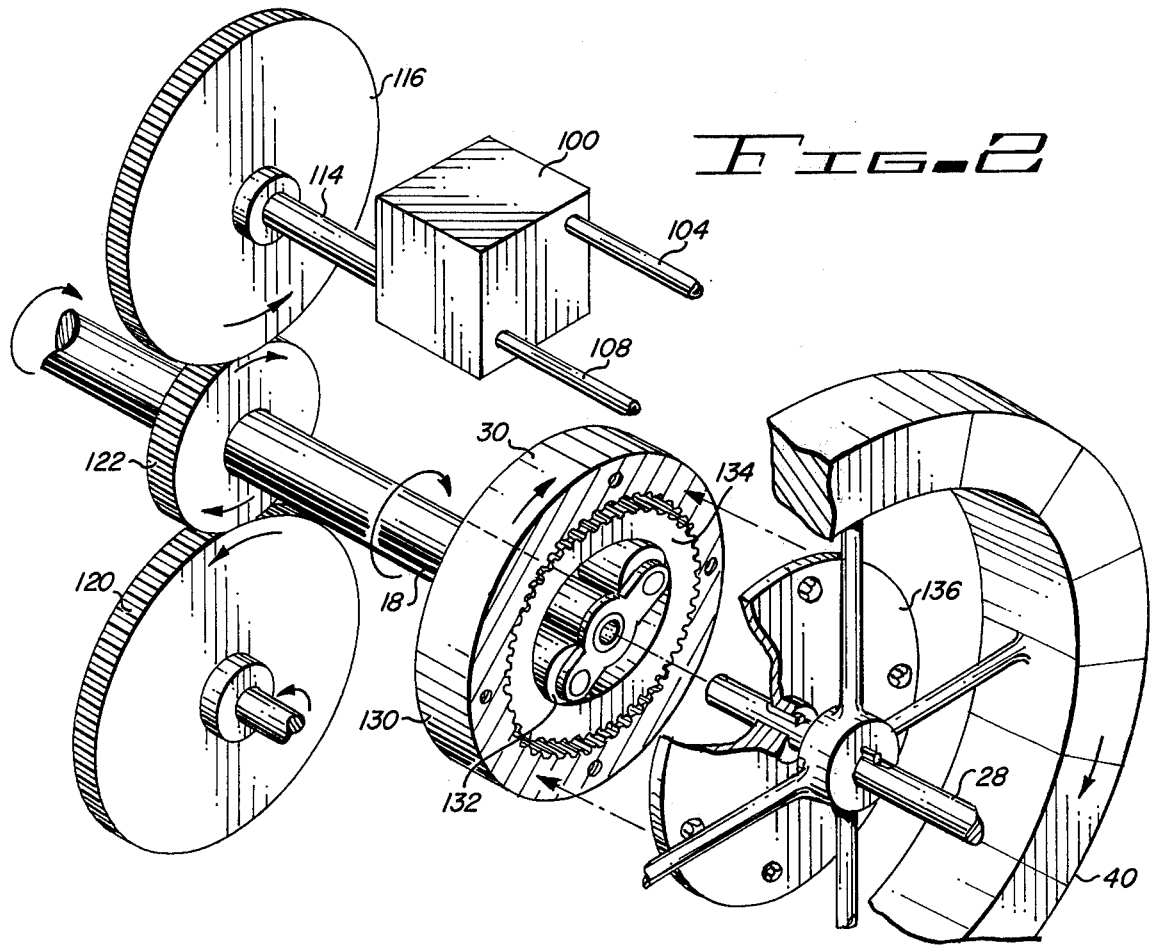
FIG. 2 is a perspective view illustrating a portion of the drive mechanism of the engine of the present invention.
Figure 10:
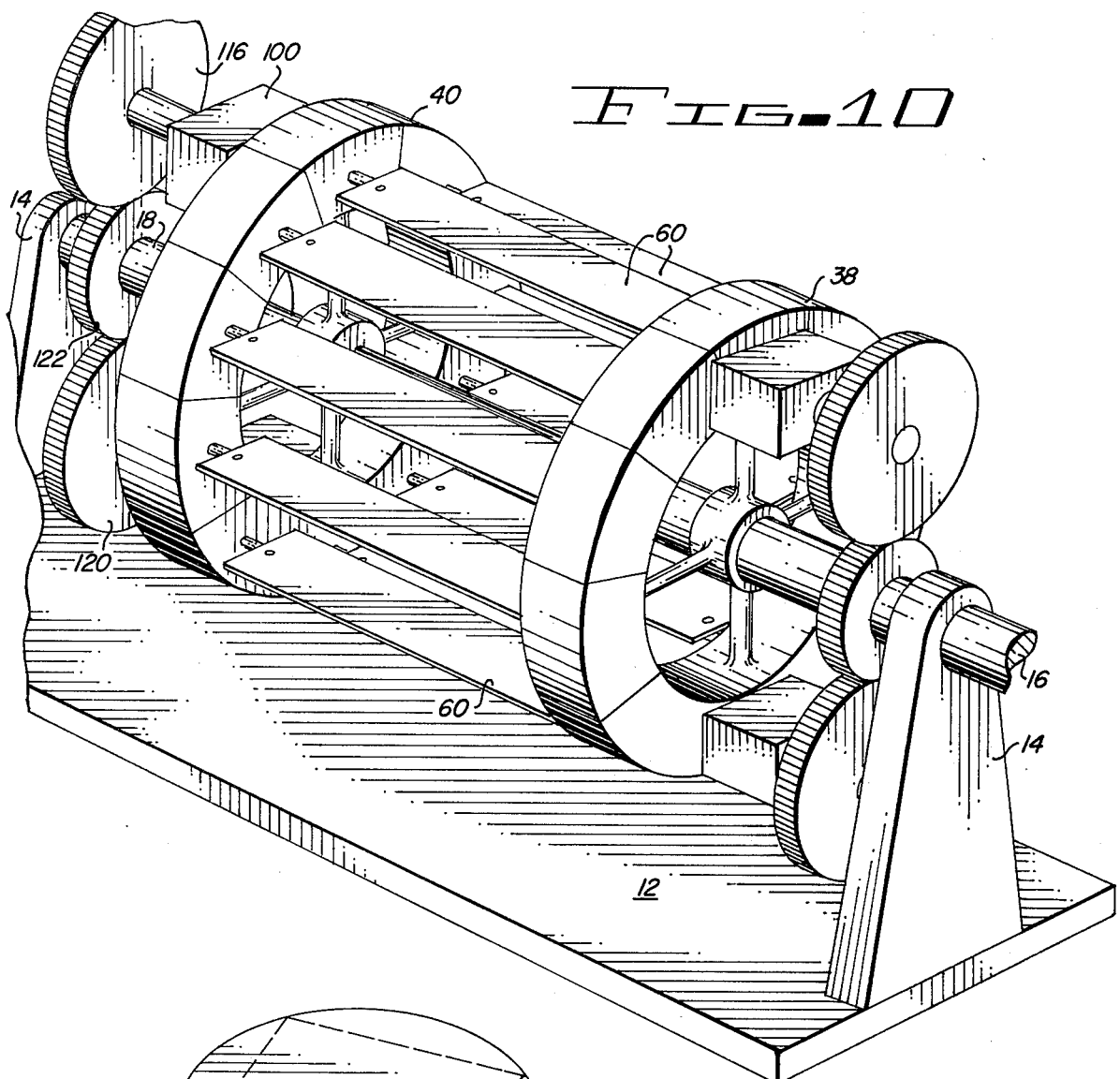
FIG. 10 is a perspective view of the thermal engine shown in FIG. 1.

Referring now to the drawings, particularly FIGS. 1 through 6, and 11, the thermal engine of the present invention is generally designated by the numeral 10. Engine 10 is mounted on a base 12 which may be stationary or may be mounted on an appropriately pivotal platform. The platform may be manually, periodically adjustable about an axis parallel to the polar axis or the platform may be provided with a diurnal sun tracking mechanism as will be described hereafter.

Bearing stands 14 are mounted on base 12 and receive oppositely extending output shafts 16 and 18 mounted, respectively, in bearing assemblies 22 and 24. An axially extending drive shaft 28 is aligned with output shafts 16 and 18. One end of shaft 28 is rotative in bearing assembly 34 relative to output shaft 16. The other end of shaft 28 is in driven engagement with output shaft 18 across speed changer unit 30. A pair of rotor housings 38 and 40 are axially spaced apart and connected to shaft 28 at hubs 42 for rotation therewith. A plurality of cylinder chambers 44 are disposed in the peripheral rim 46 of the rotors. A piston 50 is reciprocal in each of the chambers 44 in rotor 38. Piston 50 is connected to a piston rod 52. Similarly, a piston 56 is reciprocal within the cylinder chambers 44 of rotor 40. A piston rod 54 is connected to each of the pistons 56.

A heat-responsive element 60 interconnects each pair of piston rods 52 and 54. As is best shown in FIG. 6, the heat-responsive element 60 may be secured to the piston rod by conventional fastening means such as rivets or bolts 61. The heat-responsive element 60 preferably is in the form of a bi-metallic element comprised of strips of thermally dissimilar metals 63 which are bonded or secured together so that they will function as a single mechanical unit. The individual metal strips have different thermal coefficients of expansion so that the element 60 will deform in a predictable manner in response to a change in temperature, since one of the strips will expand or contract at a greater rate than the other strips. This results in change in curvature of the element 60 and a corresponding change in overall axial length of the strip. This, in turn, causes the attached piston rods to be reciprocated within their respective cylinder chambers 44.

The construction of the rotor housing and cylinder chambers is best seen in FIGS. 1, 3, 4, 5 and 6. The rim 46 of the rotor housings is comprised of an interconnected series of individual housings 59 which are interconnected at flange 62 to form the annular rim. The opposite faces 64 and 66 of the housing 60 each define a semicylindrical bore 68. It will be observed that when adjacent housings 59 are secured in place with face 66 of one housing abutting face 64 of the adjacent housing, chamber 44 is defined therebetween by bores 68. A pair of annular passages 76 and 70 extend through the housing member 50 and are connected to each of the cylinder chambers 44 near the inner end of ports 72 and 78, respectively. Another pair of annular passageways 82 and 86 extend through the housing member 59 and are in communication with the cylinder chambers 44 near their outer ends by means of ports 84 and 88, respectively. Ports 80, 81, 83, and 85, respectively communicate with passages 76, 70, 82 and 86, respectively.

Each cylinder chamber 44 is enclosed by a cover 90 secured to the face of housing 59 by bolts or cap screws 91. Conventional elastomeric seal 92 prevents leakage of hydraulic fluid from the cylinder chamber. A concentric opening 94 receives the piston rod 54. It will be obvious that the construction of the opposed rotor 38 is essentially the same and therefore a detailed description is not deemed necessary.

One or more hydraulic motors 100 are secured for rotation with each of the rotors 38 and 40. The number and selection of the motor will depend on the size, number and characteristics of the cylinders. Two motors 100 are shown diametrically opposed on the rotor. Hydraulic motors 100 may be of any conventional type such as gear, vane or piston type hydraulic motors. The input ports of motors 100 are connected to annular passageways 76 and 82 via ports 80 and 83 and hydraulic transmission line 104 across one-way check valves 106 which permit flow only from the cylinder chambers to the motor and prevent reverse flow. Similarly, annular chambers 70 and 86 are connected to the discharge port of motors 100 by hydraulic line 108. Check valves 110 prevent reverse flow from the hydraulic cylinders to the motor. The hydraulic interconnection of the motors 100 with the cylinder chambers 44 can be made by conventional fittings. It will be seen that reciprocation of the pistons 56 will actuate the motors 100 on rotor 40. Similarly, reciprocation of piston 50 will, in the same manner, actuate motors 100 associated with rotor 38.

The output shafts 114 of motors 100 are each keyed to a gear 116 having spur, bevel or other similar tooth configuration. Gears 116 are in driving engagement with gear 122 which is secured to output shaft 18. The operation of the unit will be described in detail hereafter, however, it will be appreciated that operation of motors 100 will impart rotation to shaft 18. The inner end of shaft 18 is connected as the input to speed reducer 30. Speed reducer 30 may be of any convenient type but is shown as a durable, high efficiency harmonic drive.

Opposed rollers 132 are carried on the inner end of shaft 18 and rotate within gear 134. Gear 134 is externally toothed and is flexible and will rotate internally toothed ring member 130 at a reduced speed. Ring 130 is secured to drive plate 136 which is keyed to shaft 28.

In order to increase the temperature differential to which the heat-responsive elements are subjected, cooling means may be provided. A water spray nozzle 55 is shown positioned to cool the elements 60 at the bottom of the rotational cycle. Other forms of cooling may be used. For example, air flow could be induced across the elements or the elements could be submerged in a cooling bath or reservoir.

The thermal engine of the present invention will be more fully understood from the following description of operation. The thermal engine 10 is installed at a location and orientation so that the heat-responsive elements 60 are exposed to maximum solar radiation when at the top of the rotational cycle as shown in FIG. 1. Base 12 may be pivotally adjustable and can be turned two or three times a day around an axis parallel to the polar axis to increase efficiency of operation. Cooling may be in the form of water spray directed across the elements at nozzle 55. As is well known, as the heat-responsive elements 60 are heated by solar radiation, the elements will deflect due to the bi-metallic construction of the element. The deflection of the elements 60 will, in turn, exert a force component on the attached opposed piston rods 52 and 54. Pistons 50 and 56 will be pulled towards the outer end of the cylinder chambers. Fluid will accordingly be displaced from the outer chambers which are contracted in volume and will be discharged through port 84 and annular passage 82 to the inlet of motors 100. The flow of fluid will actuate the motors 100 causing gears 116 to oppositely rotate imparting rotation to interengaging gear 122. Fluid discharged from the hydraulic motors will be returned via line 110 and annular passage 70 and port 72 to the inner cylinder chamber.

Mechanical energy delivered to driven shafts 18 and 16 can be utilized to some advantage as, for example, to drive an electrical generating apparatus. Shaft 18 also serves to drive speed changer 30 which in turn drives shaft 28 which carries rotors 38 and 40. Rotors 38 and 40 are turned at a predetermined speed in accordance with conditions of solar radiation and the characteristics of the heat-responsive elements 60.

As elements 60 continue to rotate from the uppermost position toward the lowermost position, cooling occurs. This cooling is due partially to the shading of preceding cooling elements and may also be accomplished by external cooling means such as spray nozzle 55. As the thermal elements 60 are cooled, the elements 60 tend to return to their normal, undeflected position thereby urging pistons 50 and 56 inwardly.

Inward movement of the pistons causes discharge of hydraulic fluid via port 78, annular passage 76, port 80 and line 104 to the hydraulic motors 100. Return flow to fluid discharged from the motors is via annular passageway 86 and port 88.

Since there are a plurality of cylinders in operation at all times and at different operating conditions, a positive flow of hydraulic fluid to the motors is established at all times. The check valves 106 and 110 pervent reverse flow between the hydraulic cylinders and the motors.

It will be appreciated that although the preferred embodiment utilizes an opposed piston arrangement, only a single rotor could be used. In this case, one end of the heat-responsive element would be connected to a hydraulic piston and the opposite end rigidly secured.

FIGS. 7 and 9 illustrate an alternate embodiment of the heat-responsive elements. In this form, each of the heat-responsive elements 160 comprises a housing 161 defining a cylindrical bore 162. External fins 198 are carried on housing 161. Housing 161 is interconnected between spaced apart rotors 178 and 179. Opposed pistons 164 and 166 are carried on piston rods 172 and 174, respectively, which extend into cylinder chambers 193 and 195 formed in the rotors 179 and 178, respectively. Chamber 170 is defined within bore 162 between opposed pistons 164 and 166. Biasing springs 168 concentrically mounted about piston rods 172 and 174 urge the pistons outwardly from their respective associated rotors. Hydraulic porting and circuitry interconnecting the cylinder chambers with the motors is essentially the same as has been described with reference to the previously described figures and for brevity are not repeated here.

Chamber 170 between the pistons contains a suitable working fluid having a relatively low vapor point. Typical of fluids of this type would be Freon or ammonia. The operation of the solar engine utilizing the heat responsive element 160 shown in FIG. 7 is essentially the same as has been described above. Chamber 170 is heated as radiation energy is absorbed. Absorption of radiant energy is increased by exterior fins 198. As chamber 170 is heated, the working fluid in the chamber vaporizes and the internal pressure in the chamber increases causing pistons 164 and 166 to move inwardly to their respective chambers 193 and 195. Hydraulic fluid is displaced from the cylinder chambers to actuate the hydraulic motors. Return fluid from the hydraulic motors is returned to the cylinder chambers.

It is within the scope of the present invention to construct a motor having a combination of heat-responsive elements of different types. For example, the elements shown in FIGS. 5 and 7 could, in some applications, be advantageously used on a single motor.

FIG. 8 is a schematic view showing a modified form of the hydraulic circuitry that may be used with the motor of the present invention. FIG. 8 uses a single hydraulic drive motor 200. All of the rotor cylinder chambers are connected to motor 200. Hydraulic transmission line 208 connects the cylinder chambers on either side of the piston with the inlet port of motor 200 across check valves 202. Hydraulic line 204 connects the discharge port of motor 200 to the cylinder chambers across check valves 206. Actuator 160 may be as shown in FIG. 7 or may be of the type shown in FIG. 1. In other respects, the systems operate as has been previously described.

Figure 11:
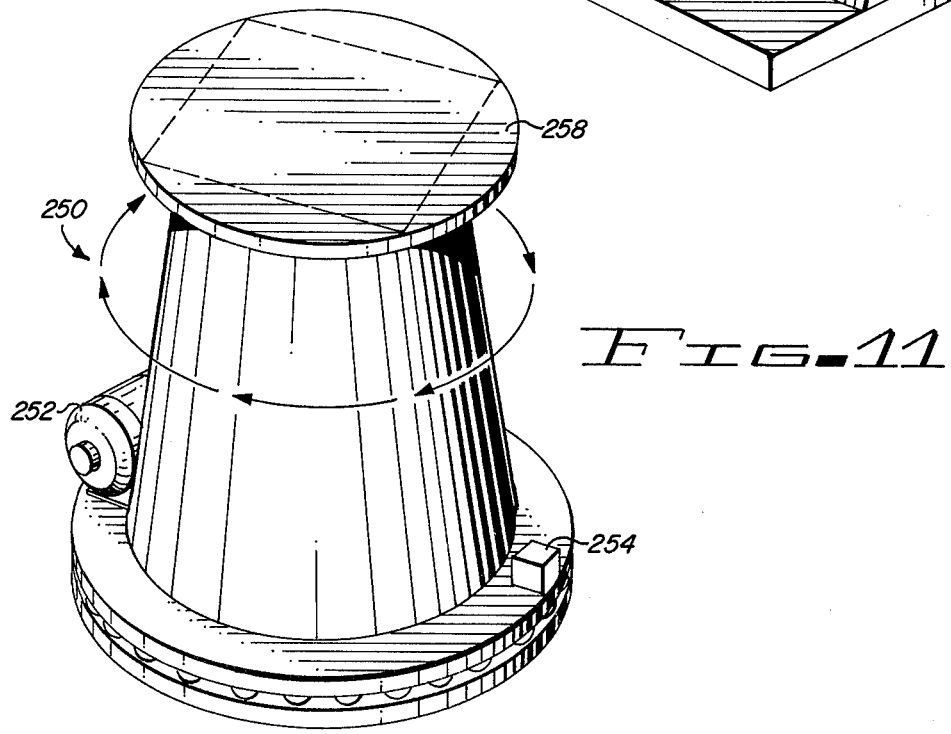
FIG. 11 is a perspective view illustrating a pedestal base upon which the unit may be mounted for diurnal and azimuth tracking.

FIG. 11 illustrates a mounting pedestal 250 which may be used to support the solar motor 10 of the present invention to automatically orient the engine with the sun for maximum efficiency. Pedestal 250 includes a table or platform 258 which is mounted on a conventional gimbal arrangement driven through a gear motor 252. Diurnal azimuth rotation is generated by dc gear motor 252 through an appropriate harmonic drive. The elevation axis or tilt motion is generated by a linear hydraulic actuator, not shown. A closed loop servo control system includes a photo sensor 254 which actuates the gear motor and hydraulic actuator.

Tracking devices of this general type are well known in the prior art and a detailed description is not deemed necessary. Several tracking platforms or pedestals for use in conjunction with heliostats are described in the proceedings of the 1975 International Energy Congress and Exposition and are representative of the device shown in this figure.

It is also possible to construct a heat-responsive element in accordance with the present invention which mechanically deflects in response to application of heat and also generates a vapor pressure. For example, a heat-responsive element such as shown in FIG. 6 could be modified so that one bi-metallic strip 63 defines a suitable internal chamber which contains a fluid such as freon or ammonia. This chamber is connected to a cylinder chamber on one side of a piston. The chamber on the opposite side of the piston contains hydraulic fluid and movement of the piston in response to generated vapor pressure induces flow of hydraulic fluid as explained above.

The thermal engine of the present invention can also be utilized with suitable energy storage means during periods when thermal energy is not available in sufficient quantities to activate the engine. For example, the output shaft 18 of the engine could operate an electrical generator connected to storage batteries which can be drawn upon as required. It is also within the scope of the present invention to use the power produced to compress a suitable fluid such as air and use the air for power generation when necessary. Another method of energy storage is to convert the output of the engine to kinetic energy by raising weights against the force of gravity or compressing springs which could be selectively released when power output is desired.

It will be appreciated that although the present invention has been described primarily as a solar motor absorbing radiant energy, other energy sources may be used to power the motor of the present invention. For example, the thermal responsive elements can be heated by conduction or convection by waste heat from other processes or by direct application of heat from a burner. The term "radiant heat" as used throughout is not intended to be by way of limitation as to the application and uses of the present invention.

It will be seen that the present invention provides a solar engine of a unique design which transforms expansion and contraction of an element heated by solar radiation into hydramechanical energy. The mechanical output from the system may be used for many purposes including the generation of electrical energy. It will be obvious to those skilled in the art to make various changes, alterations and modifications to the invention herein described. To the extent that these changes, alterations and modifications do not depart from the spirit and scope of the appended claims, they are intended to be encompassed therein.

I claim:

1. A thermal motor for converting heat energy to mechanical energy comprising:
   a. a rotor defining a plurality of cylinder chambers each having a reciprocable piston therein;
   b. heat-responsive means which mechanically move in response to a temperature change operatively connected to said pistons;
   c. a hydraulic circuit including a hydraulic motor having an output shaft, said circuit interconnecting said cylinder chambers with said motor whereby reciprocation of said piston actuates said motor; and
   d. means for rotating said rotor a predetermined rotational speed to selectively expose said heat-responsive means to a heat source.

2. The thermal motor of claim 1 wherein said hydraulic motor output shaft is operatively connected to drive said rotor.

3. The thermal motor of claim 1 wherein said heat-responsive means comprise bi-metallic elements.

4. The thermal motor of claim 1 wherein said thermal motor is mounted on platform means for diurnal tracking.

5. The thermal motor of claim 3 wherein said bi-metallic elements are peripherally mounted about said rotor.

6. The thermal motor of claim 5 wherein said motor is mounted on a tracking means to orient the bi-metallic strips with respect to the heat source.

7. The thermal motor of claim 6 further including means for cooling the heat responsive elements at a predetermined point in the rotational position of the rotor.

8. The thermal motor of claim 1 further including means for receiving and storing energy produced by said motor.

* * * * *